United States Patent
Takeda et al.

(10) Patent No.: US 12,225,558 B2
(45) Date of Patent: Feb. 11, 2025

(54) TERMINAL AND COMMUNICATION METHOD

(71) Applicant: NTT DOCOMO, INC., Tokyo (JP)

(72) Inventors: Daiki Takeda, Tokyo (JP); Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 416 days.

(21) Appl. No.: 17/753,386

(22) PCT Filed: Sep. 5, 2019

(86) PCT No.: PCT/JP2019/035069
§ 371 (c)(1),
(2) Date: Mar. 1, 2022

(87) PCT Pub. No.: WO2021/044602
PCT Pub. Date: Mar. 11, 2021

(65) Prior Publication Data
US 2022/0272664 A1    Aug. 25, 2022

(51) Int. Cl.
*H04W 72/00* (2023.01)
*H04W 16/14* (2009.01)
(Continued)

(52) U.S. Cl.
CPC .......... *H04W 72/30* (2023.01); *H04W 16/14* (2013.01); *H04W 56/001* (2013.01);
(Continued)

(58) Field of Classification Search
CPC .......... H04W 56/0015; H04W 56/001; H04W 56/00; H04W 56/005; H04W 56/0025;
(Continued)

(56) References Cited

U.S. PATENT DOCUMENTS

2018/0213493 A1   7/2018  Chakraborty et al.
2018/0302870 A1* 10/2018  Abedini ............ H04W 56/0015
(Continued)

FOREIGN PATENT DOCUMENTS

| JP | WO 2019216341 | * | 5/2019 |
| WO | 2019-066575 A1 | | 4/2019 |
| WO | 2019-068587 A1 | | 4/2019 |

OTHER PUBLICATIONS

International Search Report issued in PCT/JP2019/035069, mailed on Mar. 17, 2020 (4 pages).
(Continued)

*Primary Examiner* — Phong La
(74) *Attorney, Agent, or Firm* — Osha Bergman Watanabe & Burton LLP

(57) ABSTRACT

A terminal includes a reception unit that receives, from a base station, a first set including a plurality of resources that include at least a synchronization signal and optionally further include a broadcast channel and a second set including a plurality of resources that include at least a synchronization signal added to the first set in a frequency domain and optionally further include a broadcast channel, a control unit that assumes a Quasi co location (QCL) identical to a QCL assumed for the first set when receiving the second set, and a communication unit that executes a random access procedure with the base station based on information included in the resources.

5 Claims, 17 Drawing Sheets

(51) Int. Cl.
*H04W 56/00* (2009.01)
*H04W 72/04* (2023.01)
*H04W 72/0446* (2023.01)
*H04W 72/0453* (2023.01)
*H04W 72/30* (2023.01)
*H04W 74/08* (2024.01)
*H04W 74/0833* (2024.01)

(52) U.S. Cl.
CPC ... *H04W 72/0446* (2013.01); *H04W 72/0453* (2013.01); *H04W 74/0833* (2013.01)

(58) Field of Classification Search
CPC ......... H04W 74/0833; H04W 74/0836; H04W 74/0838; H04L 5/0057; H04L 5/0053
See application file for complete search history.

(56) References Cited

U.S. PATENT DOCUMENTS

| | | | |
|---|---|---|---|
| 2019/0069256 A1 | 2/2019 | Jung et al. | |
| 2019/0229973 A1* | 7/2019 | Sengupta | H04J 11/0079 |
| 2019/0254073 A1* | 8/2019 | Sheng | H04W 72/23 |
| 2020/0314709 A1* | 10/2020 | Ly | H04W 36/00725 |
| 2020/0351955 A1* | 11/2020 | Jeon | H04W 80/02 |

OTHER PUBLICATIONS

Written Opinion of the International Searching Authority PCT/JP2019/035069, mailed on Mar. 17, 2020 (3 pages).

Ericsson; "Remaining details on RACH procedure"; 3GPP TSG RAN WG1 Meeting #91, R1-1720941; Reno, Nevada, USA, Nov. 27-Dec. 1, 2017 (21 pages).

Intel Corporation; "Remaining Details of SS/PBCH Block"; 3GPP TSG RAN WG1 Meeting #91, R1-1720057; Reno, Nevada, USA, Nov. 27-Dec. 1, 2017 (6 pages).

3GPP TS 38.300 V15.6.0; "3rd Generation Partnership Project; Technical Specification Group Radio Access Network; NR; NR and NG-RAN Overall Description; Stage 2 (Release 15)"; Jun. 2019 (99 pages).

3GPP TS 38.211 V15.6.0; "3rd Generation Partnership Project; Technical Specification Group Radio Access Network; NR; Physical channels and modulation (Release 15)"; Jun. 2019 (97 pages).

Extended European Search Report issued in European Application No. 19944014.0, dated Apr. 18, 2023 (9 pages).

* cited by examiner

TERMINAL AND COMMUNICATION METHOD

TECHNICAL FIELD

The present invention relates to a terminal and a communication method in a wireless communication system.

BACKGROUND ART

In New Radio (NR) (also referred to as "5G") which is a successor system of Long Term Evolution (LTE), technology satisfying a large-capacity system, a high-speed data transmission rate, a low delay, simultaneous connection of multiple terminals, a low cost, power saving, and the like are is under review (for example, Non-Patent Document 1).

In future expansions of NR or in future wireless standards, wireless communication using millimeter waves is discussed, and using a wide range of frequencies of up to a frequency band higher than that of LTE is expected. In particular, because propagation loss increases in a high frequency band, applying beam forming with a narrow beam width to compensate for the propagation loss is discussed (for example, Non-Patent Document 2). Further, various kinds of signals suitable for communication in bands in which frequencies much higher than those used in the related art such as 52.6 GHz or higher are used are discussed.

CITATION LIST

Non-Patent Document

Non-Patent Document 1: 3GPP TS 38.300 V15.6.0 (2019 June)
Non-Patent Document 2: 3GPP TS 38.211 V15.6.0 (2019 June)

SUMMARY OF THE INVENTION

Problem to be Solved by the Invention

The propagation loss is relatively large in communication in bands in which frequencies much higher than those used in the related art are used. In this regard, in order to reduce the influence of the propagation loss, a complex area design related to a coverage is expected to be required when beam forming with a narrow beam width is applied.

The invention was made in light of the foregoing, and it is an object of the invention to control the coverage in the wireless communication system.

Means for Solving Problem

According to the technology of the disclosure, a terminal including a reception unit that receives, from a base station, a first set including a plurality of resources that include at least a synchronization signal and optionally further include a broadcast channel and a second set including a plurality of resources that include at least a synchronization signal added to the first set in a frequency domain and optionally further include a broadcast channel, a control unit that assumes a Quasi co location (QCL) identical to a QCL assumed for the first set when receiving the second set, and a communication unit that executes a random access procedure with the base station based on information included in the resources is provided.

Effect of the Invention

According to the technology of the disclosure, it is possible to control the coverage in the wireless communication system.

MODE(S) FOR CARRYING OUT THE INVENTION

Figure 1:
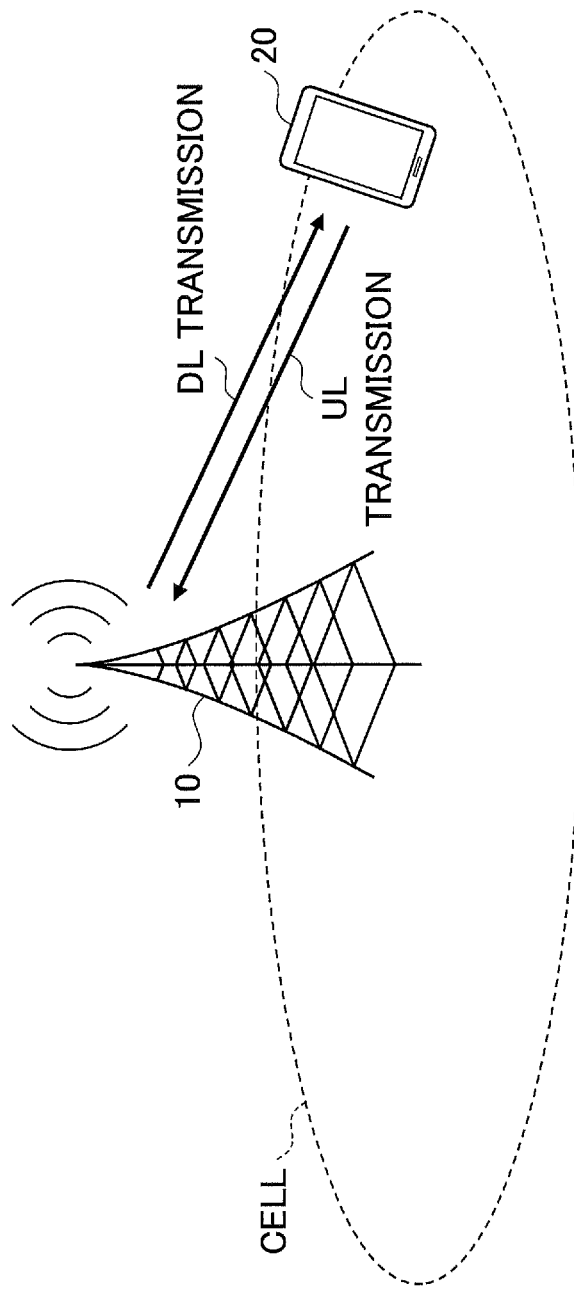
FIG. 1 is a diagram illustrating a configuration example of a wireless communication system in an embodiment of the present invention.

Hereafter, exemplary embodiments of the invention will be described with reference to the appended drawings. Embodiments to be described below are examples, and embodiments to which the invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) unless otherwise specified.

Also, according to an embodiment of the invention to be described below, terms such as a synchronization signal (SS), a primary SS (PSS), a secondary SS (SSS), a physical broadcast channel (PBCH), a physical random access channel (PRACH), a physical downlink control channel (PDCCH), a Physical Downlink Shared Channel (PDSCH), a physical uplink control channel (PUCCH), and a physical uplink shared channel (PUSCH) used in the existing LTE are used. This is for convenience of description, and signals, functions, or the like similar to them may be indicated by other names. The above terms in NR correspond to NR-SS, NR-PSS, NR-SSS, NR-PBCH, NR-PRACH, NR-PDCCH, NR-PDSCH, NR-PUCCH, NR-PUSCH, and the like. However, even a signal used for NR is not always indicated by "NR-."

Also, according to an embodiment of the present invention, a duplex scheme may be a Time Division Duplex (TDD) scheme, may be a Frequency Division Duplex (FDD) scheme, or may be other schemes (for example, Flexible Duplex or the like).

In the following description, a method of transmitting a signal using transmission beams may be digital beam forming that transmits a signal multiplied by a precoding vector (precoded with a precoding vector) or may be analog beam forming that realizes beam forming using a variable phase shifter in a radio frequency (RF) circuit. Similarly, a method of receiving a signal using reception beams may be digital beam forming that multiplies a received signal by a predetermined weight vector or analog beam forming that realizes beam forming using a variable phase shifter in an RF circuit. Hybrid beam forming in which the digital beam forming and the analog beam forming are combined may be applied. Further, transmitting a signal using transmission beams may be transmitting a signal through a specific antenna port. Similarly, receiving a signal using reception beams may be receiving a signal through a specific antenna port. The antenna port refers to a logical antenna port or a physical antenna port defined in the 3GPP standard.

The method of forming transmission beams and reception beams is not limited to the above method. For example, in a base station 10 or a terminal 20 including a plurality of antennas, a method of changing an angle of each antenna may be used, a method in which a method of using a precoding vector and a method of changing angles of antennas are combined may be used, different antenna panels may be switched and used, a method of combining methods of using a plurality of antenna panels together may be used, or other methods may be used. Also, for example, a plurality of different transmission beams may be used in a high frequency band. The use of a plurality of transmission beams is called a multi-beam operation, and the use of one transmission beam is called a single-beam operation.

Further, according to an embodiment of the present invention, when a radio parameter or the like is "configured," it may mean that a predetermined value is pre-configured or may mean that a radio parameter indicated by a base station 10 or a terminal 20 may be configured.

FIG. 1 is a diagram illustrating a configuration example of a wireless communication system according to an embodiment of the present invention. The wireless communication system according to an embodiment of the invention includes the base station 10 and the terminal 20 as illustrated in FIG. 1. FIG. 1 illustrates one base station 10 and one terminal 20, but this is an example, and a plurality of base stations 10 or a plurality of terminals 20 may be provided.

The base station 10 is a communication device that provides one or more cells and performs wireless communication with the terminal 20. Physical resources of a radio signal are defined by the time domain and the frequency domain, and the time domain may be defined by the number of Orthogonal Frequency Division Multiplexing (OFDM) symbols, and the frequency domain may be defined by the number of sub-bands or resources blocks. The base station 10 transmits a synchronization signal and system information to the terminal 20. The synchronization signal is, for example, an NR-PSS or an NR-SSS. The system information is transmitted, for example, through an NR-PBCH and is also called broadcast information. As illustrated in FIG. 1, the base station 10 transmits a control signal or data to the terminal 20 in downlink (DL) and receives a control signal or data from the terminal 20 in uplink (UL). Both the base station 10 and terminal 20 can transmit and receive signals by performing beam forming. Further, both the base station 10 and the terminal 20 can apply Multiple Input Multiple Output (MIMO) communication to DL or UL. Further, both the base station 10 and the terminal 20 may perform communication via a secondary cell (SCell) and a primary cell (PCell) through carrier aggregation (CA).

The terminal 20 is a communication device with a wireless communication function such as a smart phone, a mobile phone, a tablet, a mobile terminal, or a machine-to-machine (M2M) communication module. As illustrated in FIG. 1, the terminal 20 uses various kinds of communication services provided by the wireless communication system by receiving a control signal or data from the base station 10 in DL and transmitting a control signal or data to the base station 10 in UL.

Figure 2:
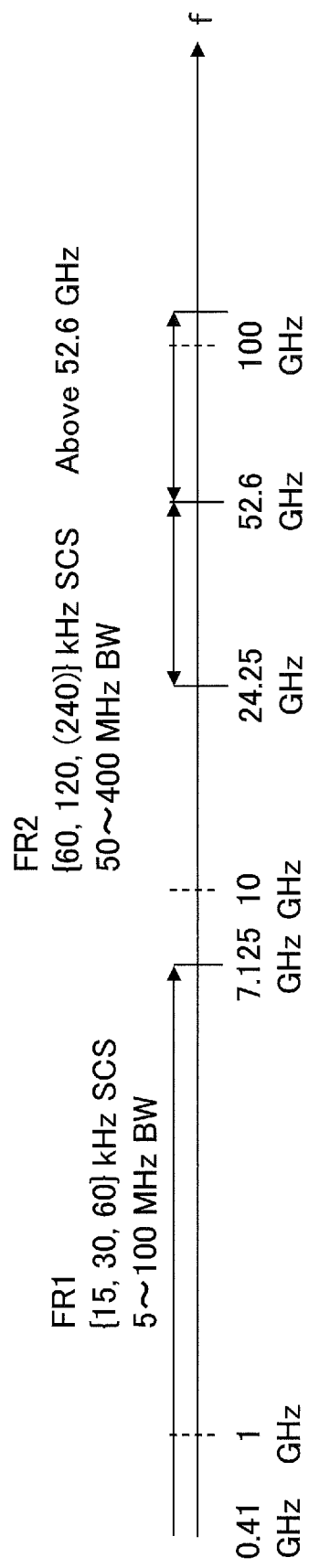
FIG. 2 is a diagram for describing an example of frequency bands.

FIG. 2 is a diagram for describing an example of frequency bands. An operation of frequency bands of up to 52.6 GHz such as a frequency range 1 (FR1) and a frequency range 2 (FR2) is under review in NR specifications of 3rd Generation Partnership Project (3GPP) Releases 15 and 16. As illustrated in FIG. 2, in the FR1, a subcarrier spacing (SCS) is 15 kHz, 30 kHz, or 60 kHz, and a bandwidth is 5 MHz to 100 MHz. In the FR2, the SCS is 60 kHz, 120 kHz or 240 kHz, and the bandwidth is 50 MHz to 400 MHz.

Furthermore, in Release 16, the operation of the frequency band from 52.6 GHz to 114.25 GHz is mentioned an item for consideration for an NR radio access network layer. The design of various kinds of signals used for initial access in NR of 52.6 GHz or higher is under review. The frequency illustrated in FIG. 2 is an example, and the frequency band may be defined by different frequencies.

Figure 3:
FIG. 3 is a diagram illustrating a configuration example (1) of an SS/PBCH block.

FIG. 3 is a diagram illustrating a configuration example (1) of an SS/PBCH block. FIG. 3 illustrates a configuration example of a synchronization signal/physical broadcast channel (SS/PBCH) block used for initial access of NR release 15. As illustrated in FIG. 3, the time domain is configured with four OFDM symbols. A 1st symbol, a PSS is arranged over 12 physical resource blocks (PRBs). In a second symbol and a fourth symbol, a PBCH is arranged over 20 PRBs. In a 3rd symbol, an SSS is arranged over 12 PRBs in the center of the frequency domain, and a PBCH is arranged over 4 PRBs at both ends of the frequency domain. Also, as illustrated in FIG. 3, a demodulation reference signal (DMRS) used for PBCH demodulation is arranged. Hereinafter, an "SS/PBCH block" is also referred to as an "SSB."

In the embodiment of the present invention, the NR SS/PBCH block may be used for the initial access, and a signal of a format that includes at least a synchronization signal and optionally further include a broadcast channel may be used for the initial access.

Figure 4:
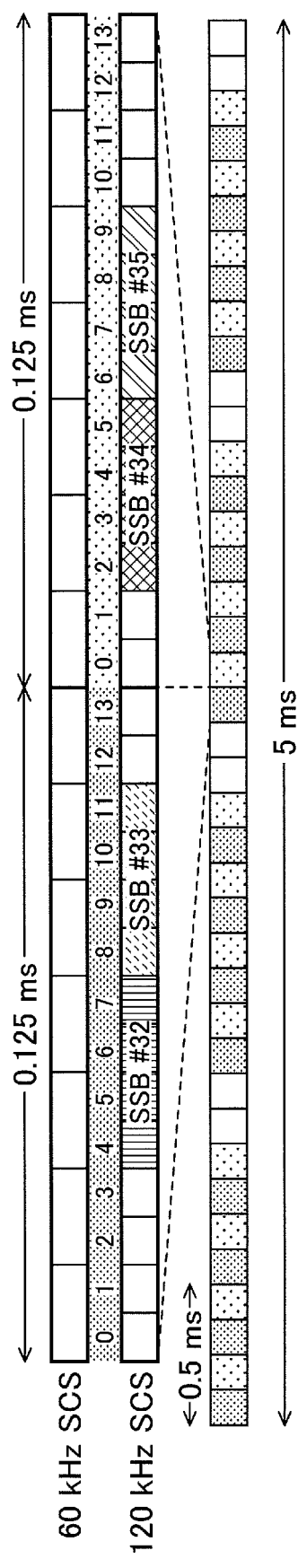
FIG. 4 is a diagram illustrating an arrangement example (1) of an SS/PBCH block.

FIG. 4 is a diagram illustrating an arrangement example (1) of an SS/PBCH block. FIG. 4 illustrates an example in which an SS/PBCH block used for the initial access of NR release 15 is arranged in a radio frame. On the radio frame with an SCS of 120 kHz illustrated in FIG. 4, 4 SS/PBCH blocks are arranged over 0.25 ms corresponding to 2 slots, and 64 SS/PBCH blocks are arranged over 5 ms corresponding to 40 slots.

FIG. 4 is an arrangement example of an SS/PBCH block in a case in which a subcarrier interval of a radio signal in which the SS/PBCH block is transmitted is 120 kHz and the frequency band is 6 GHz to 52.6 GHz. In the figure illustrated in units of slots of 5 ms, slots #0 to #39 are arranged in time order. An SSB #32 is arranged in symbols #4 to #7 of a slot #20, and an SSB #33 is arranged in symbols #8 to #11. An SSB #34 is arranged in symbols #2 to #5 of a slot #22, and an SSB #35 is arranged in symbols #6 to #9. With a similar slot inside configuration, SSBs #0 to #15 are arranged in slots #0 to #7, SSBs #16 to #31 are arranged in slots #10 to #17, SSBs #32 and #47 are arranged in slots #20 to #27, and SSBs #48 to #63 are arranged in slots #30 to #37. The radio frame which is the SCS of 120 kHz may be used for transmission and reception of an SSB and data, and the radio frame which is the SCS of 60 kHz may be used for transmission and reception of data.

Figure 5:
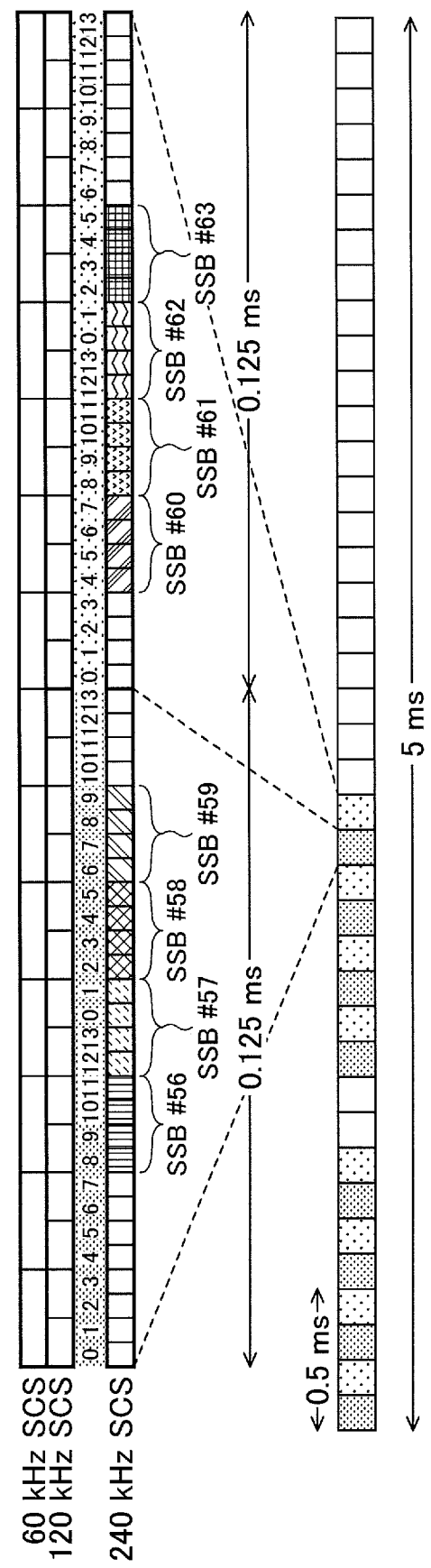
FIG. 5 is a diagram illustrating an arrangement example (2) of an SS/PBCH block.

FIG. 5 is a diagram illustrating an arrangement example (2) of the SS/PBCH block. FIG. 5 illustrates an example in which the SS/PBCH block used for the initial access of NR release 15 is arranged in a radio frame. On a radio frame with an SCS of 240 kHz illustrated in FIG. 5, 8 SS/PBCH blocks are arranged over 0.25 ms corresponding to 4 slots, and 64 SS/PBCH blocks are arranged over 5 ms corresponding to 80 slots.

In FIG. 5, slots indicated by 5 ms slot units are slots #0 to #79 in time order, but it is illustrated in FIG. 5 that one square corresponds to 2 slots. An SSB #56 is arranged in symbols #8 to #11 of a slot #32, an SSB #57 is arranged in symbols #12 to #1 of a slot #33, and an SSB #58 is arranged in symbols #2 to #5, and an SSB #59 is arranged in symbols #6 to #9. An SSB #60 is arranged in symbols #4 to #7 of a slot #34, an SSB #61 is arranged in symbols #8 to #11, an SSB #62 is arranged in symbols #12 to #1 of a slot #35, and an SSB #63 is arranged in symbols #2 to #5. With a similar slot inside configuration, SSBs #0 to #31 are arranged in slots #0 to #15, and SSBs #32 to #63 are arranged in slots #20 to #35. The radio frame with the SCS of 240 kHz may be used for transmission and reception of an SSB, and the radio frames which are the SCS of 60 kHz and the SCS of 120 kHz may be used for transmission/reception of data.

Figure 6:
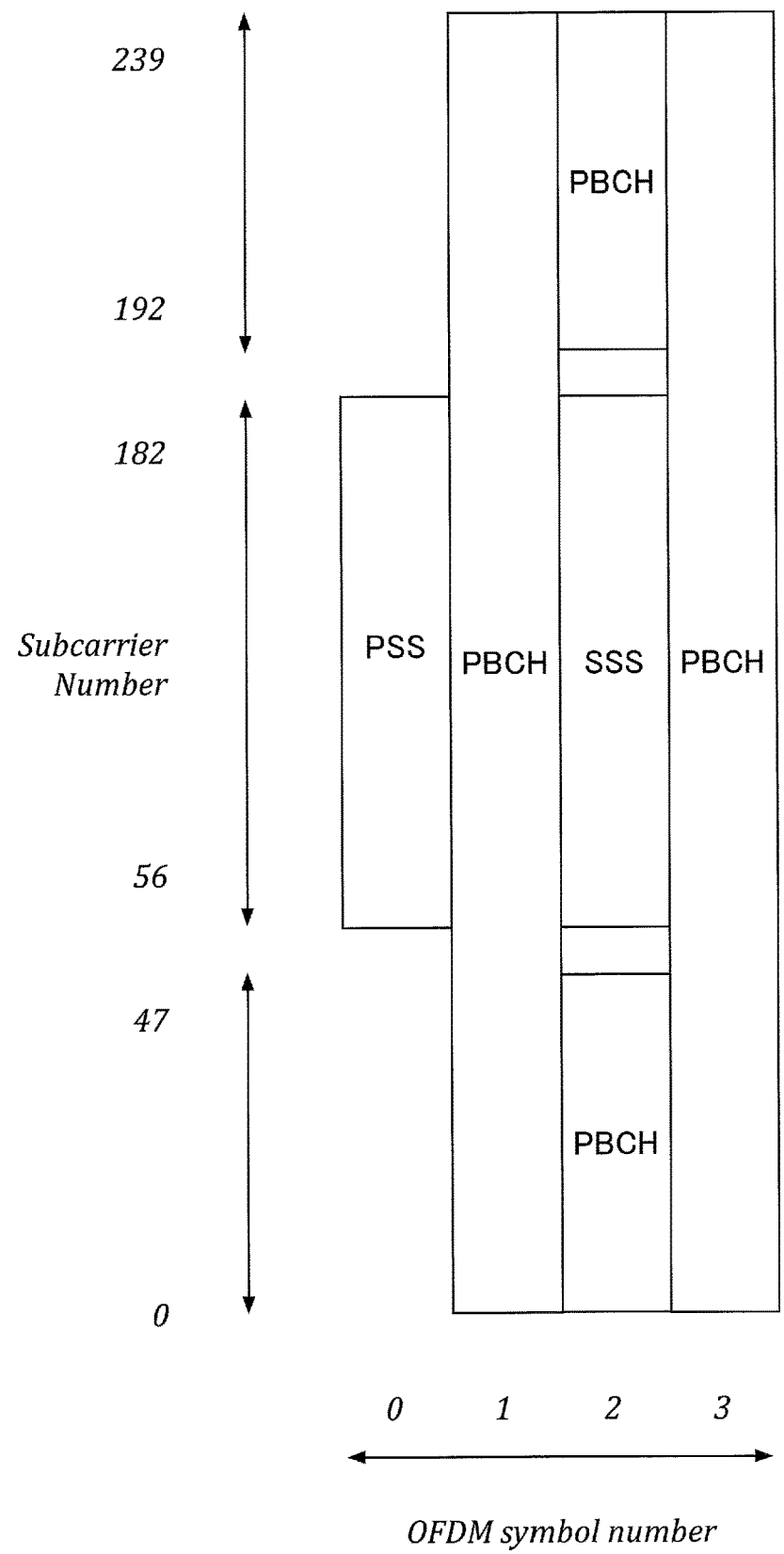
FIG. 6 is a diagram illustrating a configuration example (2) of an SS/PBCH block.

FIG. 6 illustrates a configuration example (2) of the SS/PBCH block. In the configuration example of the SS/PBCH block used for the initial access of NR release 15 in FIG. 6, the frequency domain is indicated by the number of subcarriers. As illustrated in FIG. 6, the time domain is configured with 4 OFDM symbols. In a symbol number 0, a PSS is arranged over subcarrier numbers 56 to 182. In symbol numbers 2 and 4, a PBCH is arranged over subcarrier numbers 0 to 239. In a 3rd symbol, an SSS is arranged over subcarrier numbers 56 to 182 in the middle of the frequency domain, and PBCHs are arranged over subcarrier numbers 0 to 47 and subcarrier numbers 192 to 239 at both ends of the frequency domain.

Figure 7:
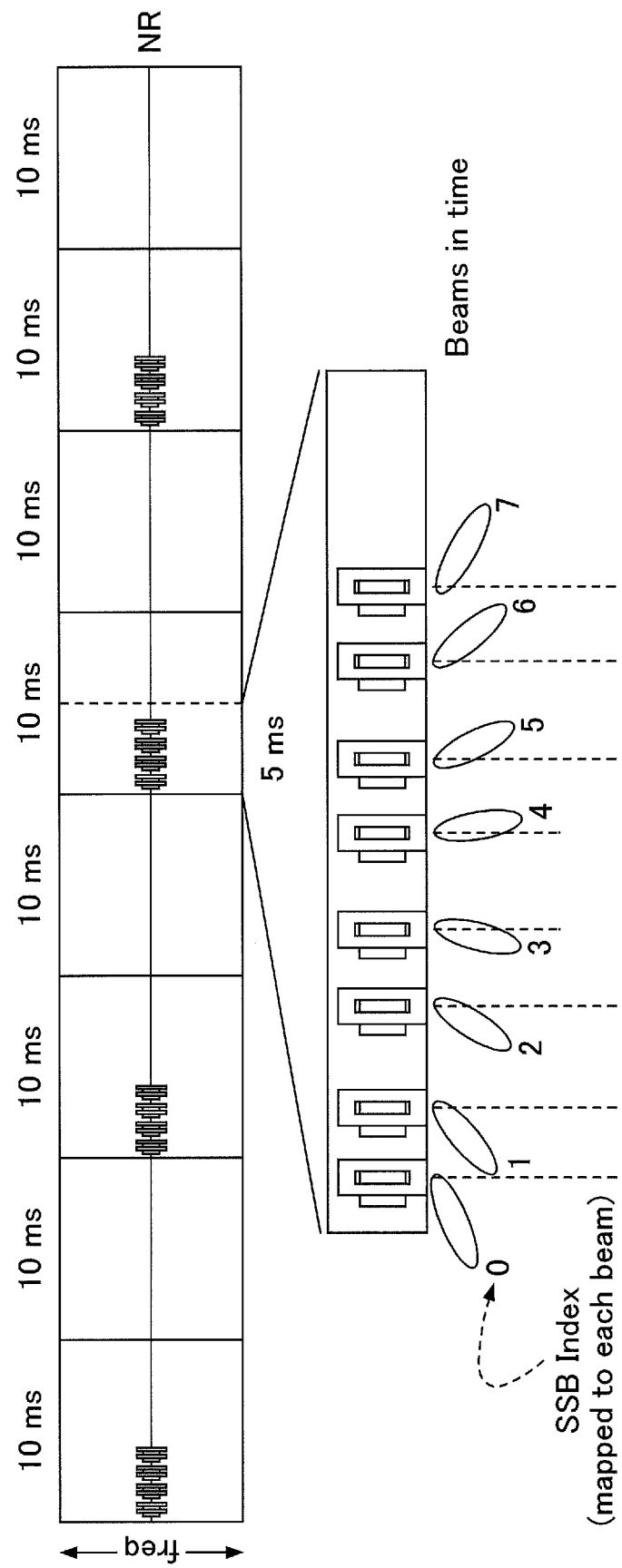
FIG. 7 is a diagram illustrating an arrangement example (3) of an SS/PBCH block.

FIG. 7 is a diagram illustrating an arrangement example (3) of the SS/PBCH block. A transmission period of the SS/PBCH block may be, for example, 5 ms, 10 ms, 20 ms, 40 ms, 80 ms, or 160 ms. As illustrated in FIG. 7, the terminal 20 may assume that the SS/PBCH block is transmitted with a period of 20 ms in the initial access. A window for detecting the SS/PBCH block may be limited to 5 ms. As illustrated in FIG. 7, the SS/PBCH blocks may correspond to different beams. FIG. 7 is an example in which SSB indexes 0 to 7 are mapped to 8 different beams.

Figure 8:
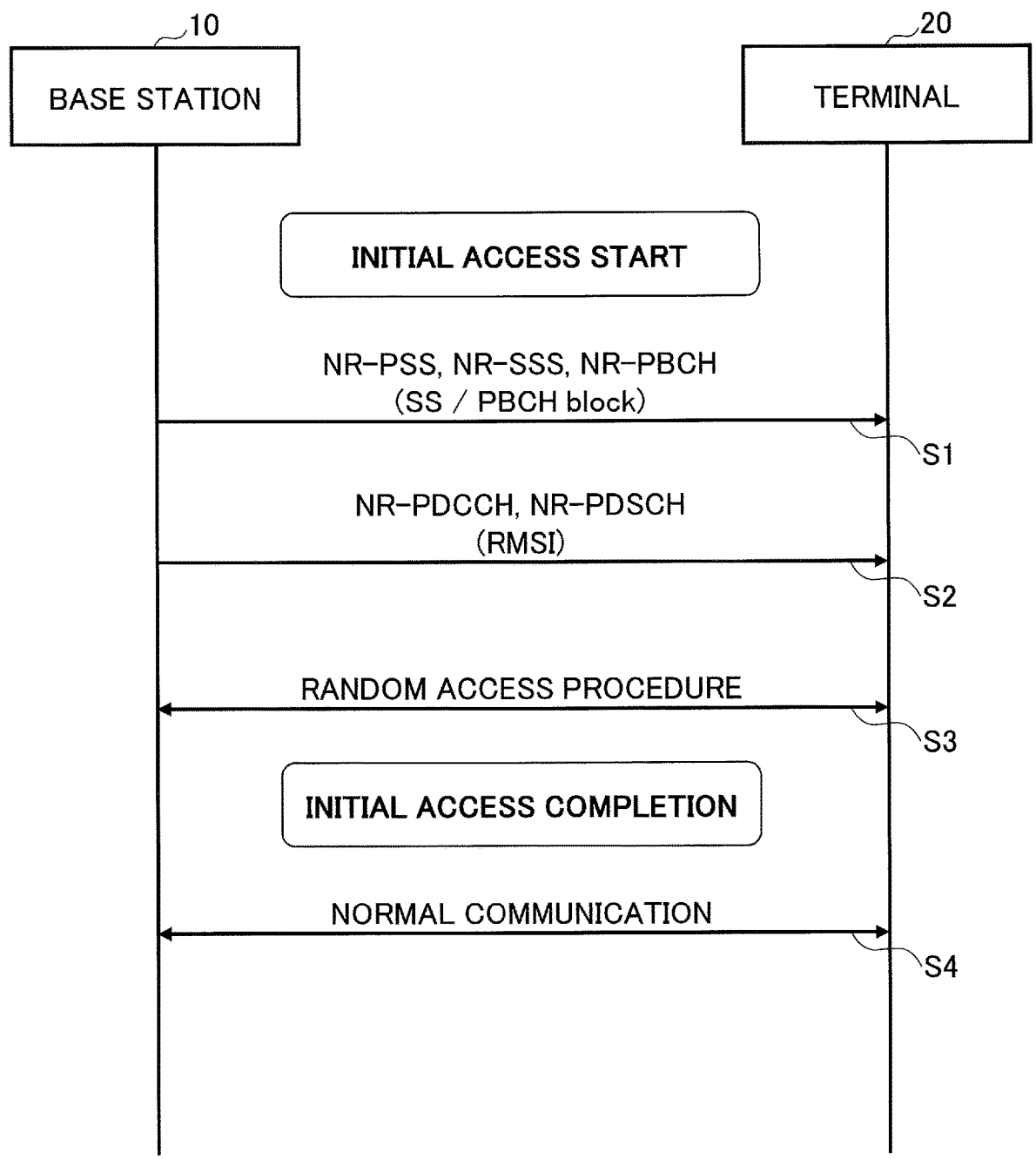
FIG. 8 is a sequence diagram for describing an example of initial access in an embodiment of the present invention.

FIG. 8 is a sequence diagram for describing an example of the initial access in an embodiment of the present invention. When the initial access is started, in step S1, the base station 10 transmits an NR-PSS, an NR-SSS, and an NR-PBCH, that is, the SS/PBCH block to terminal 20. The NR-PBCH contains a part of system information. The base station 10 may repeatedly transmit multiple SS/PBCH blocks with a predetermined period to the terminal 20. In a multi-beam operation environment, when multiple SS/PBCH blocks are transmitted within a period, the multiple SS/PBCH blocks may be associated with different beams.

On the other hand, the terminal 20 receives the NR-PSS transmitted from the base station 10 and uses it at least to specify an initial time, frequency synchronization, and a part of a cell ID (identity). Also, the terminal 20 receives the NR-SSS transmitted from the base station 10 and uses it to specify at least a part of a cell ID. Also, the terminal 20 receives the NR-PBCH transmitted from the base station 10 and acquires part of system information necessary for the initial access such as a system frame number (a system frame number (SFN)), remaining minimum system information (RMSI) of other system information, and the like.

Then, in step S2, other system information including the RMSI is received by the terminal 20 via the NR-PDSCH scheduled by the NR-PDCCH. The RMSI includes information identifying a resource for executing a random access procedure, that is, information identifying a RACH resource, a preamble format, and the like.

In a case in which the multiple SS/PBCH blocks are transmitted within a period, if a certain SS/PBCH block is acquired, the terminal 20 transmits a preamble through the RACH resource associated with that SS/PBCH block and starts the random access procedure (S3).

In step S3, if the random access procedure succeeds between the base station 10 and the terminal 20, the initial access is completed, and normal communication starts (S4).

Figure 9A:
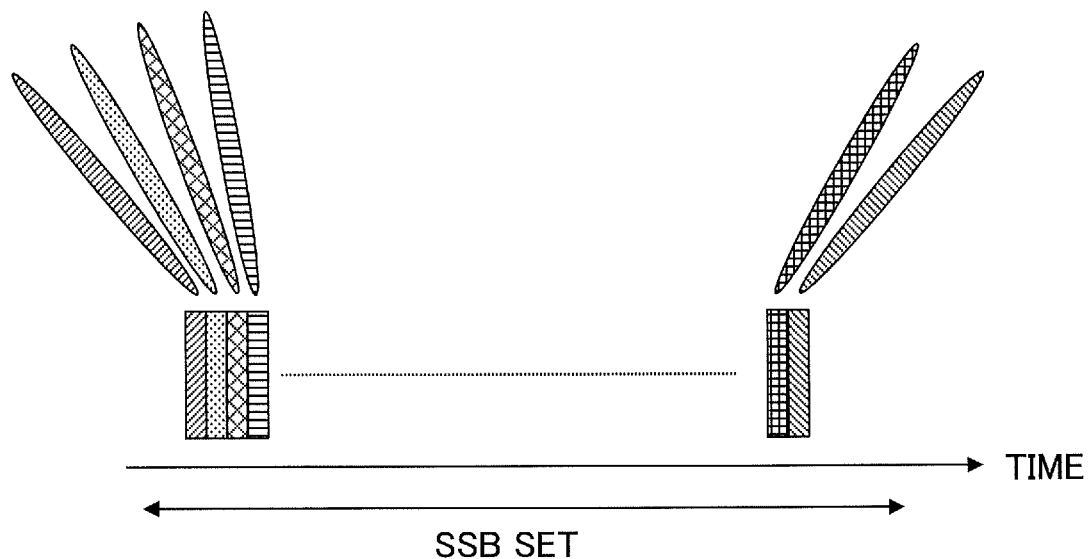
FIG. 9A is a diagram illustrating a configuration example (1) of an SS/PBCH block in an embodiment of the present invention.

FIG. 9A is a diagram illustrating a configuration example (1) of an SS/PBCH block in an embodiment of the present invention. In the initial access in the frequency band exceeding 52.6 GHz, a method of compensating for the propagation loss which increases due to the use of the frequency higher than in the related art is necessary. In this regard, as illustrated in FIG. 9A, a first method of improving the coverage by applying the MIMO using more elements and using a relatively thin beam is considered. On the other hand, it is expected that the number of beams to provide a desired coverage increases. Also, as the beam becomes narrower, repeating more initial access more than in NR is likely to be necessary.

Figure 9B:
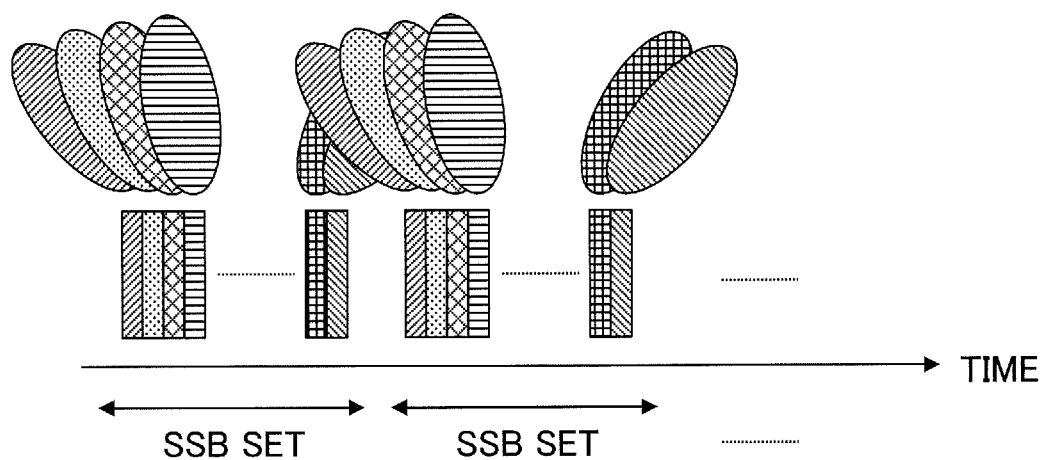
FIG. 9B is a diagram illustrating a configuration example (2) of an SS/PBCH block in an embodiment of the present invention.

FIG. 9B is a diagram illustrating a configuration example (2) of an SS/PBCH block in an embodiment of the present invention. As a second method for compensating for the propagation loss described in FIG. 9A, a method of improving the coverage using a relatively thick beam is considered. For example, as illustrated in FIG. 9B, the number of SSB sets which are SSB sets to which different beams are applied is increased by using a beam thicker than that in FIG. 9A. On the other hand, the number of SSB sets to provide a desired coverage may increase. For example, an SSB set may be configured with a maximum of 64 SSBs. Also, the SSB set may be transmitted periodically, and the SSB set may be defined as an SSB transmitted during one period of an SSB. Hereinafter, a period in which an SSB is transmitted is referred to as an "SSB period."

Here, in a factory scenario or the like which is assumed in the frequency band exceeding 52.6 GHz, it is assumed that a specific beam may provide a different coverage from an expected one due to a shield. Further, in a case in which an area design using big data is assumed in the future, it is expected that a more complicated area design is applied. In this regard, the quality related to the coverage can be changed by applying the first method of applying the MIMO using more elements than those in FIG. 9A and improving the coverage using the relatively thin beam, and thus a more flexible area design is realized.

Furthermore, in the second method illustrated in FIG. 9B, which improves the coverage by using a relatively thick beam, repetitive transmission in the time direction or repetitive transmission in the frequency direction is assumed. In a case in which the improvement in the coverage is achieved by repetitive transmission in the time direction, in the NR SSB design, the terminal 20 is assumed to improve the S/N ratio by soft-synthesizing a plurality of received SSBs. For example, in the initial access in the frequency band exceeding 52.6 GHz, the coverage can be improved to some extent by reducing a default SSB period assumed by the terminal 20 using an SSB design similar to that in NR.

In a case in which the improvement in the coverage is achieved by repetitive transmission in the time direction, at least gain related to detection by an increase in a sequence length can be obtained by using additional resource in the frequency direction. In the SSB design of NR according to the related art, it is not assumed that the terminal 20 synthesizes a plurality of SSBs in the frequency direction.

Figure 10:
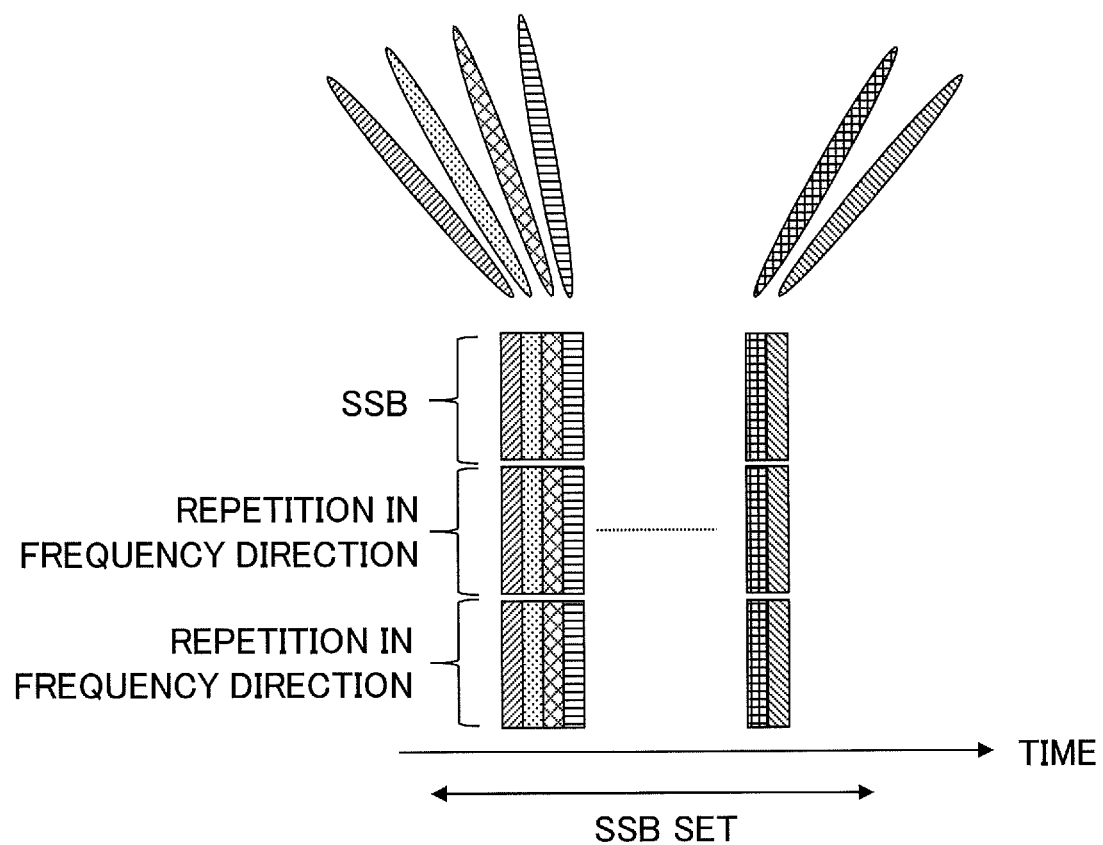
FIG. 10 is a diagram illustrating a configuration example (3) of an SS/PBCH block in an embodiment of the present invention.

FIG. 10 is a diagram illustrating a configuration example (3) of an SS/PBCH block in an embodiment of the present invention. For example, in the frequency band exceeding 52.6 GHz, the SSB design of the existing NR may be modified so that an additional SSB is arranged.

As illustrated in FIG. 10, the SSB set based on NR may be repeatedly arranged in the frequency direction. FIG. 10 illustrates an example of transmitting three SSB sets in one SSB period. The terminal 20 may assume a beam identical to that applied to an SSB set serving as a repetition source which is mandatorily transmitted as a beam applied to an additional SSB set repeatedly arranged in the frequency direction. In other words, the terminal 20 may assume that a QCL of each of SSBs configuring an additional SSB set repeatedly arranged in the frequency direction is identical to a QCL of each of SSBs configuring an SSB set serving as a repetition source which is mandatorily transmitted.

Further, for example, a correspondence relation between an SSB and a beam may be a relation in which the same beam is assumed for an additional SSB set repeatedly arranged in the frequency direction, the correspondence relation may be specified in specifications in advance, or the correspondence relation may be indicated separately.

The number of repetitions of the SSB in the frequency direction and the time and frequency positions of the SSB may be specified in specifications in advance, or parameters may be indicated separately. The base station 10 may indicate, to the terminal 20, the parameters through system information such as a system information block (SIB) or may indicate the parameters through a radio resource control (RRC) message. Alternatively, the base station 10 may indicate, to the terminal 20, the parameters implicitly in accordance with the time and frequency positions of the SSB or the SSB sequence.

Figure 11:
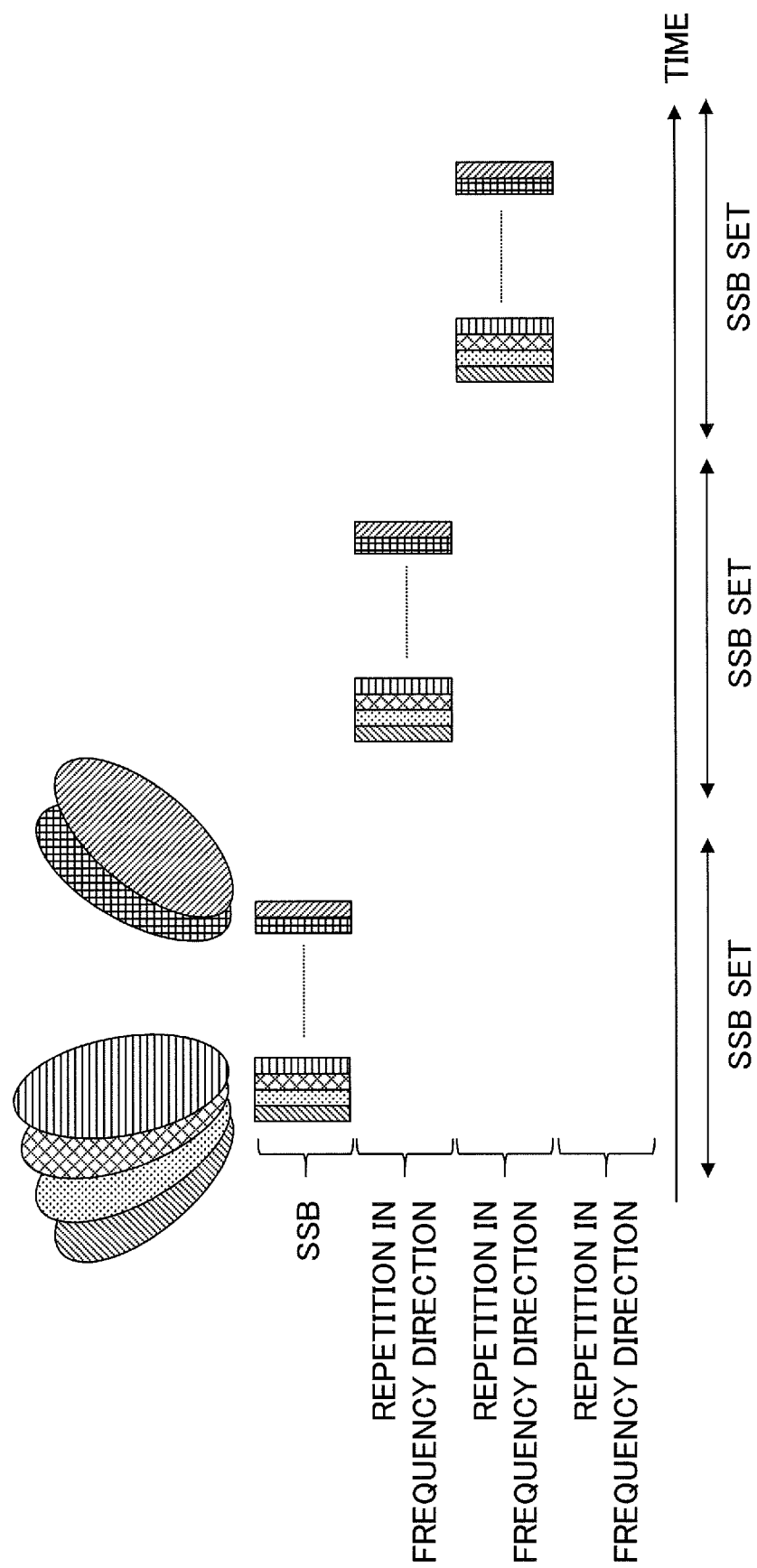
FIG. 11 is a diagram illustrating a configuration example (4) of an SS/PBCH block in an embodiment of the present invention.

FIG. 11 is a diagram illustrating a configuration example (4) of an SS/PBCH block in an embodiment of the present invention. The frequency position may be changed at each SSB period by the repeated transmission of the SSB set in the frequency direction.

As illustrated in FIG. 11, the SSB set may be transmitted at a different frequency position for each SSB period. For example, the SSB set may be transmitted for each SSB period at a frequency position lower than a lower limit frequency position in which an immediately previous SSB is arranged.

Figure 12:
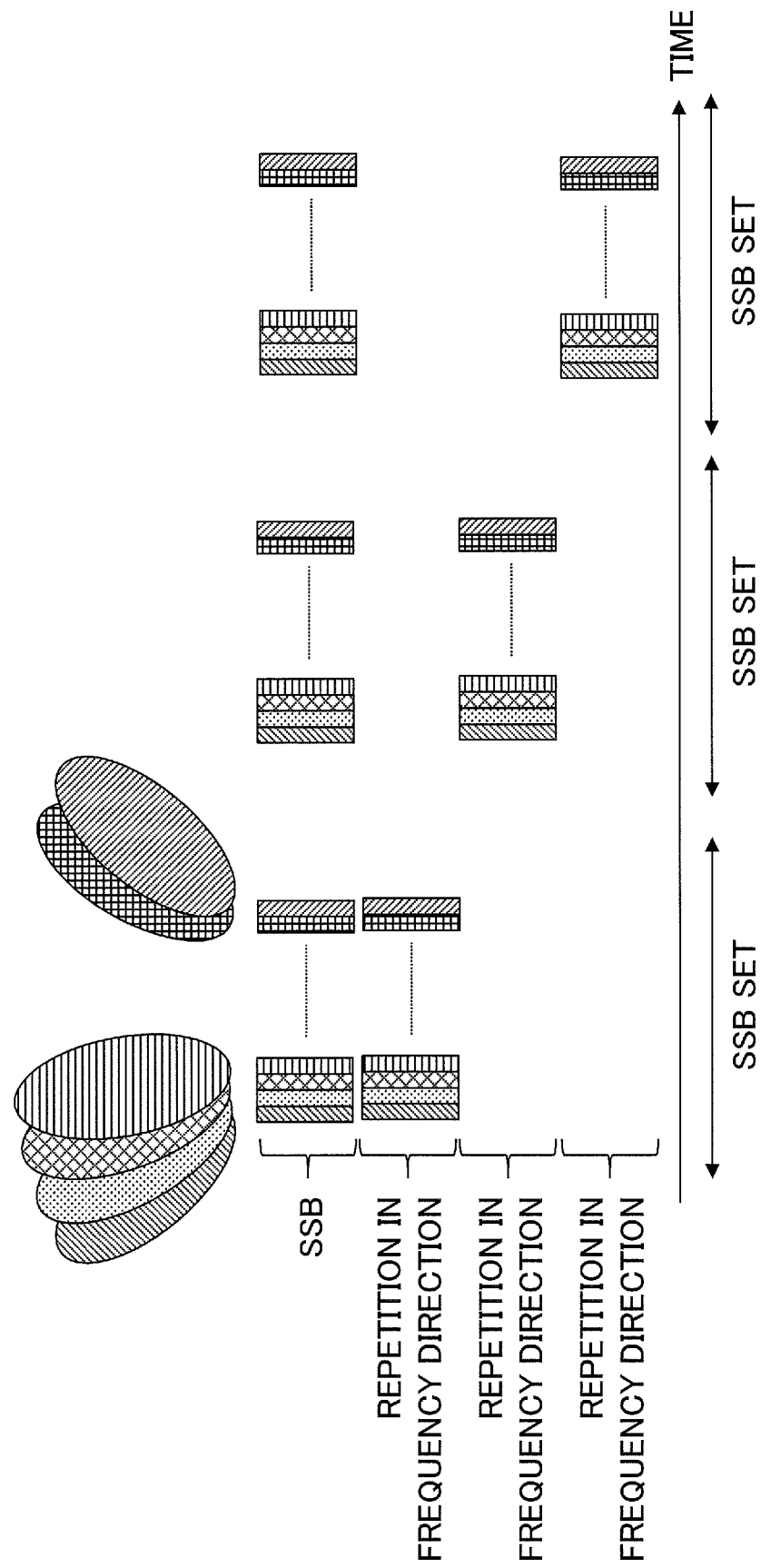
FIG. 12 is a diagram illustrating a configuration example (5) of an SS/PBCH block in the embodiment of the present invention.

FIG. 12 is a diagram illustrating a configuration example (5) of an SS/PBCH block in an embodiment of the present invention. As illustrated in FIG. 12, for each SSB period, the SSB set that is the repetition source may be transmitted at the same frequency position, and the repeated SSB sets may be transmitted at different frequency positions. For example, the repeated SSB set may be transmitted for each SSB period at a frequency position lower than the lower limit frequency position in which the immediately previous SSB is arranged. FIG. 12 illustrates an example in which two SSB sets are transmitted in one SSB period.

Figure 13:
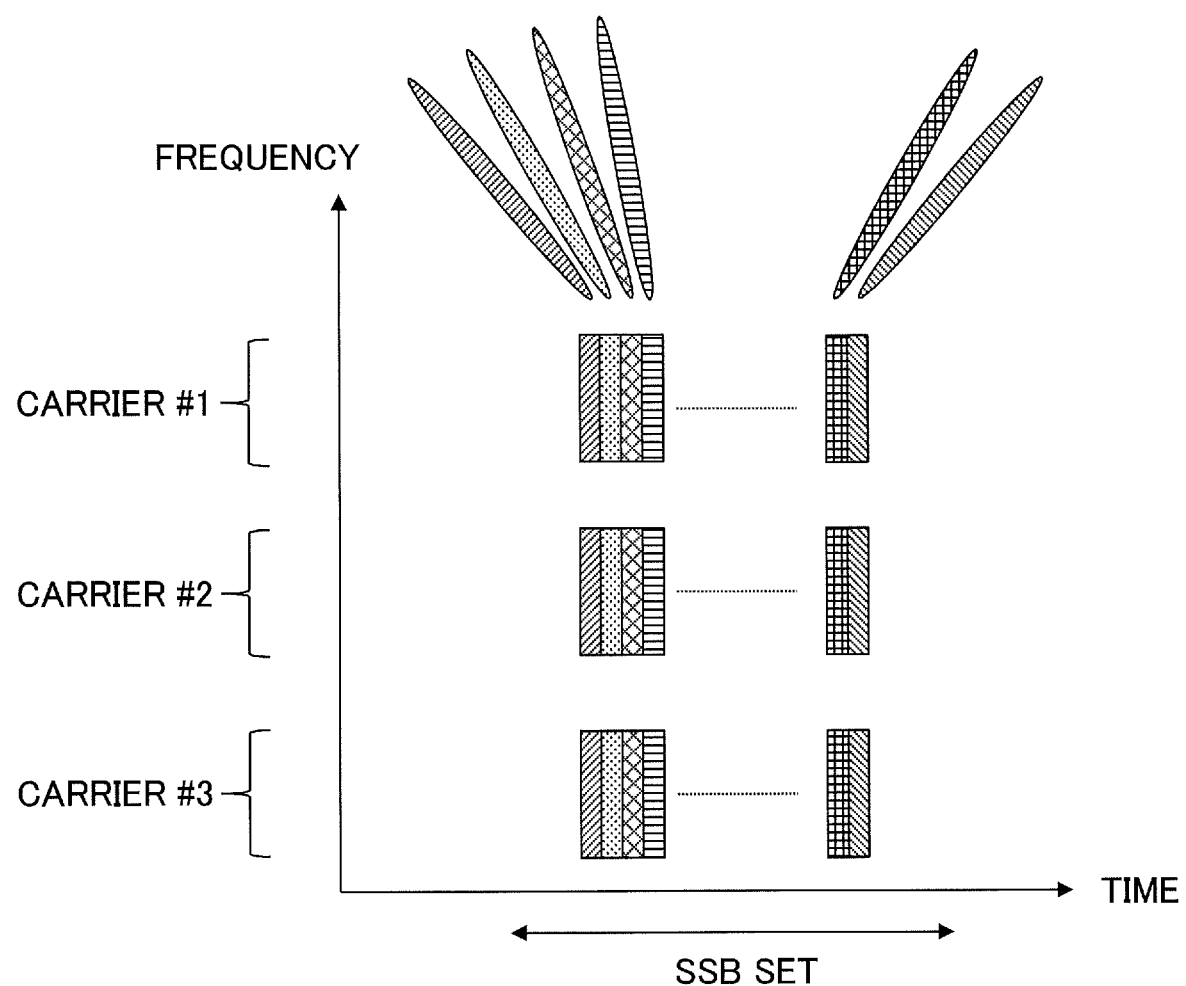
FIG. 13 is a diagram illustrating a configuration example (6) of an SS/PBCH block in the embodiment of the present invention.

FIG. 13 is a diagram illustrating a configuration example (6) of an SS/PBCH block in an embodiment of the present invention. In a case in which the base station 10 is operating multiple carriers and the multiple carriers are synchronized in time, the SSB of another carrier is configured as an additional SSB as illustrated in FIG. 13, and the configuration is indicated to the terminal 20. Further, the base station 10 may indicate, to the terminal 20, that each carrier is synchronized in time. Also, the base station 10 may indicate, to the terminal 20, that the SSB transmission pattern or the SSB set of each carrier is the same. Also, for the SSB of each carrier, the base station 10 may indicate, to the terminal 20, the time position. The terminal 20 can reduce the SSB period equivalently by receiving the SSB while retuning the RF. FIG. 13 illustrates an example in which three carriers each transmit a SSB set in one SSB period.

Figure 14:
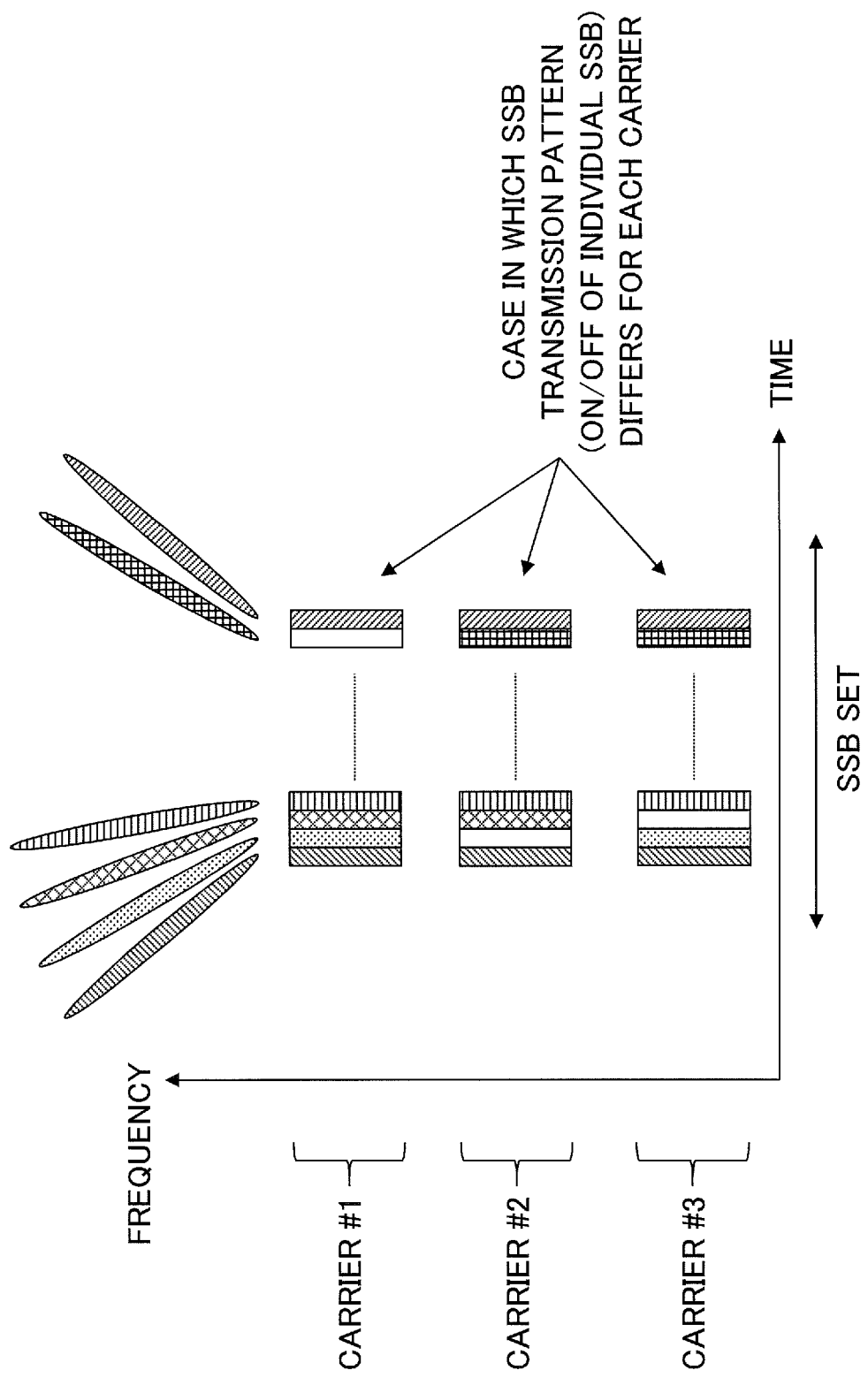
FIG. 14 is a diagram illustrating a configuration example (7) of an SS/PBCH block in an embodiment of the present invention.

FIG. 14 is a diagram illustrating a configuration example (7) of an SS/PBCH block in an embodiment of the present invention. FIG. 14 illustrates an example when the SSB transmission pattern transmitted by each carrier illustrated in FIG. 13 differs depending on the carrier. ON/OFF of an individual SSB is set to differ depending on the carrier. In a carrier #1, an SSB transmission pattern in which a second SSB from the end in the time domain is not transmitted is applied. In a carrier #2, an SSB transmission pattern in which a second SSB from the beginning in the time domain is not transmitted is applied. In a carrier #3, an SSB transmission pattern in which a third SSB from the beginning in the time domain is not transmitted is applied. An SSB set transmitted by other carriers may be added.

Figure 15:
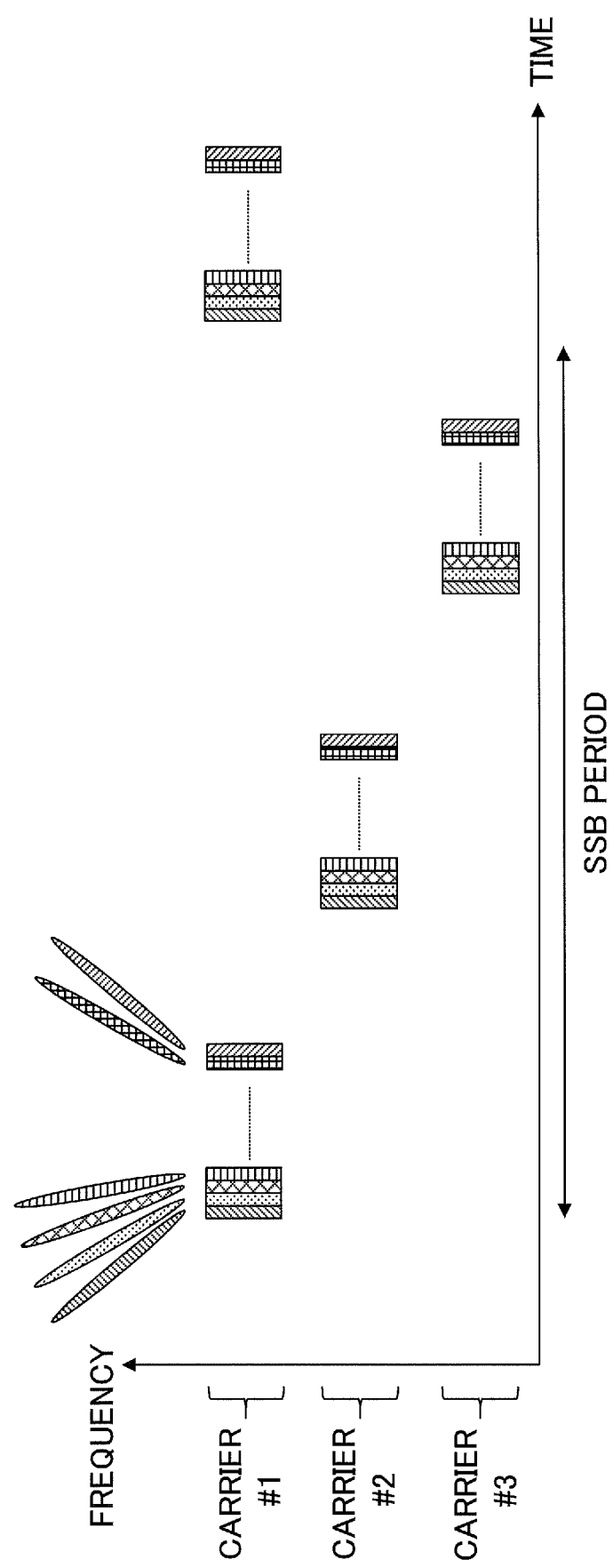
FIG. 15 is a diagram illustrating a configuration example (8) of an SS/PBCH block in an embodiment of the present invention.

FIG. 15 is a diagram illustrating a configuration example (8) of an SS/PBCH block in an embodiment of the present invention. In FIG. 15, the carrier is changed each time one SSB set to be transmitted by each carrier illustrated in FIG. 13 is transmitted. In FIG. 15, a period including three SSB sets is defined as the SSB period. In other words, one SSB period is configured by a period in which the SSB set is transmitted by the carrier #1, the SSB set is then transmitted by the carrier #2, and the SSB set is then is transmitted by the carrier #3. An SSB set transmitted by other carriers may be added.

Further, information indicating whether or not a plurality of SSBs or a plurality of SSB sets arranged in different frequency domains by arranging the SSBs in multiple carriers or by arranging the SSBs in different SS rasters are receivable together, is indicated to the terminal 20 by the base station 10, or the terminal 20 may indicate, to the base station 10, this information as a terminal capability. Further, in a case in which a plurality of SSBs or a plurality of SSB sets arranged in different frequency domains are receivable together, information such as: information related to the time and/or frequency positions of a plurality of SSBs or a plurality of SSB sets; a pattern related to the time arrangement of the SSBs or the SSB sets; or information related to the time synchronization of the carrier in which the resource is transmitted, may be indicated by the base station 10 to the terminal 20. The terminal 20 may perform control such that the SSB is received based on the received information.

Further, the embodiment of the invention can be applied regardless of distinction between uplink and downlink transmission/reception. In this case, an uplink signal or channel and a downlink signal or channel can be interchangeably interpreted. Also, uplink feedback information and downlink control signaling can be interchangeably interpreted.

In the present disclosure, the explanation was made mainly on the premise of NR (New Radio) channel and signaling method, but the embodiment of the invention can be applied to channel and signaling the method having similar function to those in NR. For example, the embodiment of the invention can be applied to LTE/LTE-A or other Radio Access Technology (RAT).

Although various signaling examples have been illustrated above, they are not limited to explicit methods and may be reported implicitly or may be uniquely specified in the specification.

In the present disclosure, various signaling examples have been illustrated above, but embodiments are not limited to those illustrated here. For example, for signaling, different layers of signaling such as RRC, MAC-CE, and DCI may be used, or master information block (MIB) or system information block (SIB) may be used.

In the present disclosure, terms such as a beam or beam forming (BF) RS are used, but whether a physical signal or a channel is beam formed may be transparent from the base station 10 or the terminal 20. Also, a beam may be formed in units of antenna ports. Similarly, for example, beam selection can be interchangeably interpreted as resource selection, and a beam index can be interchangeably interpreted as a resource index, an antenna port index, or the like.

The example and the modified examples described above can be combined with each other, and the features illustrated in these examples can be variously combined with each other. The embodiment of the invention is not limited to a particular combination disclosed in this specification.

According to the above example, the terminal 20 receives the repeatedly transmitted SS/PBCH block and improves the S/N characteristics, and thus the extended coverage can be realized. Further, the coverage area can be designed in detail for each beam by the transmission power set for each SS/PBCH block.

In other words, it is possible to control the coverage in the wireless communication system.

(Device Configuration)

Next, function configuration examples of the base station 10 and the terminal 20 that execute the processes and the operations described above will be described. The base station 10 and the terminal 20 have functions for implementing the embodiments described above. However, each of the base station 10 and the terminal 20 may have only some of the functions in the embodiment.

<Base Station 10>

Figure 16:
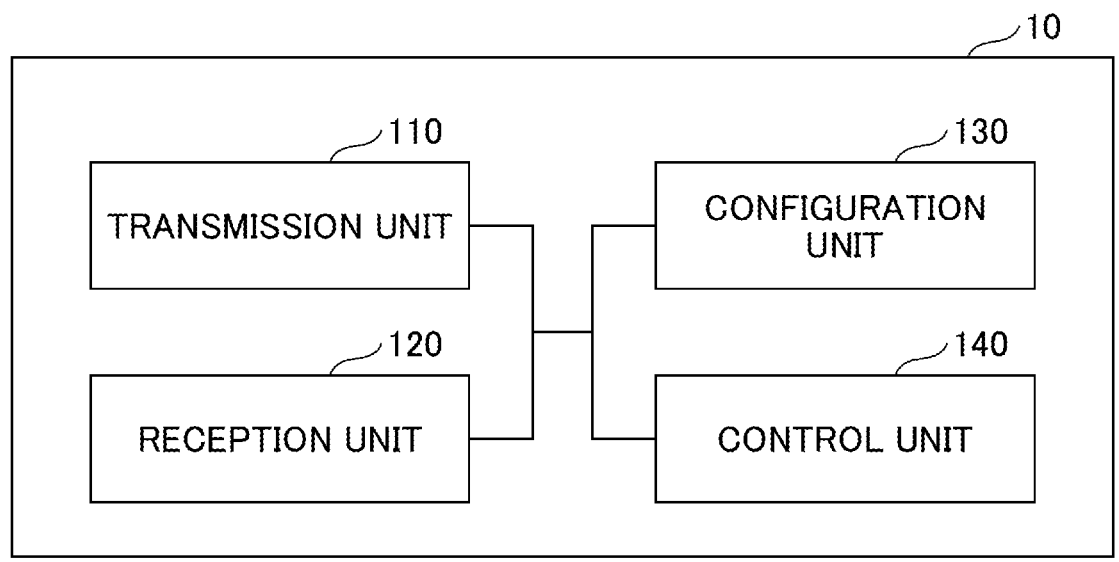
FIG. 16 is a diagram illustrating an example of a functional configuration of a base station 10 in an embodiment of the present invention.

FIG. 16 is a diagram illustrating an example of a functional configuration of the base station 10 in an embodiment of the present invention. As illustrated in FIG. 16, the base station 10 includes a transmission unit 110, a reception unit 120, a configuration unit 130, and a control unit 140. The functional configuration illustrated in FIG. 16 is only an example. A functional classification and names of the functional unit may be any classification and any names as long as the operation according to an embodiment of the invention can be executed.

The transmission unit 110 includes a function of generating a signal to be transmitted to the terminal 20 side and transmitting the signal wirelessly. Further, the transmission unit 110 transmits an inter-network node message to other network nodes. The reception unit 120 includes a function of wirelessly receiving various kinds of kinds of signals transmitted from the terminal 20 and acquiring, for example, higher layer information from the received signals. Further, the transmission unit 110 includes a function of transmitting NR-PSS, NR-SSS, NR-PBCH, and DL/UL control signals or the like to the terminal 20. Also, the reception unit 120 receives the inter-network node message from other network nodes.

The configuration unit 130 stores setting information set in advance and various kinds of kinds of setting information to be transmitted to the terminal 20. For example, content of the setting information is information or the like related to control of the initial access.

The control unit 140 controls the initial access as described in the example. As described in the embodiment, the control unit 140 performs control related to the operation of transmitting the SS/PBCH block to the terminal 20. The functional unit related to signal transmission in the control unit 140 may be included in the transmission unit 110, and the functional unit related to signal reception in the control unit 140 may be included in the reception unit 120.

<Terminal 20>

Figure 17:
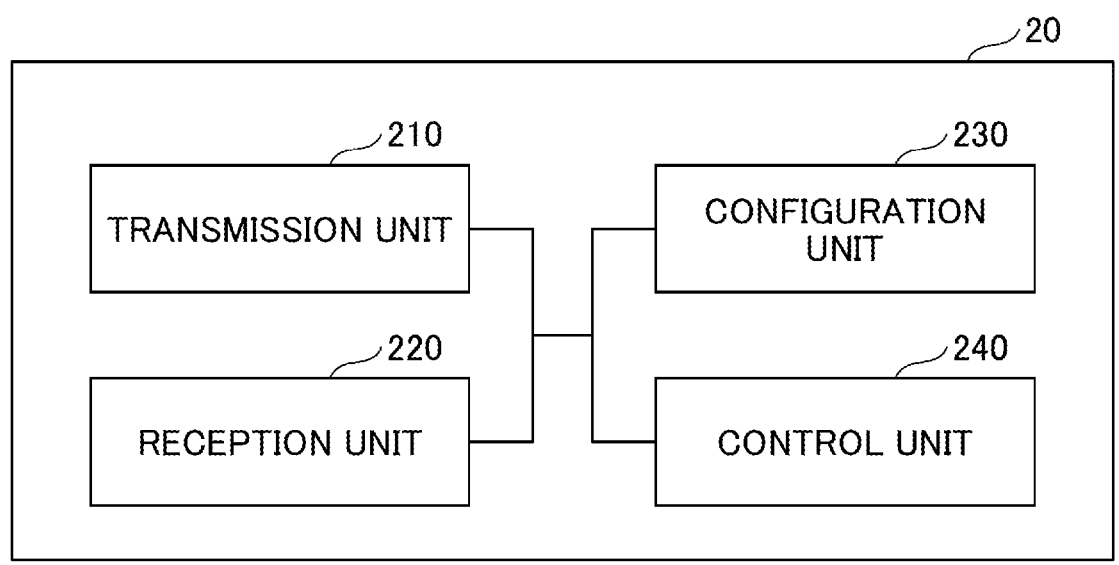
FIG. 17 is a diagram illustrating an example of a functional configuration of a terminal 20 in an embodiment of the present invention.

FIG. 17 is a diagram illustrating an example of a functional configuration of the terminal 20 in an embodiment of the present invention. As illustrated in FIG. 17, the terminal 20 includes a transmission unit 210, a reception unit 220, a configuration unit 230, and a control unit 240. The functional configuration illustrated in FIG. 17 is only an example. A functional classification and names of the functional unit may be any classification and any names as long as the operation according to an embodiment of the invention can be executed.

The transmission unit 210 has a function of generating a transmission signal from transmission data and transmitting the transmission signal wirelessly. The reception unit 220 wirelessly receives various kinds of kinds of signals and acquires higher layer signals from received physical layer signals. The reception unit 220 includes a function of receiving NR-PSS, NR-SSS, NR-PBCH, and DL/UL/SL control signals or the like transmitted from the base station 10. Further, for example, the transmission unit 210 transmits a physical sidelink control channel (PSCCH), a physical sidelink shared channel (PSSCH), a physical sidelink discovery channel (PSDCH), a physical sidelink broadcast channel (PSBCH), and the like to other terminals 20 as D2D communication, and the reception unit 220 receives PSCCH, PSSCH, PSDCH, PSBCH, and the like from other terminals 20.

The configuration unit 230 stores various kinds of kinds of setting information received from the base station 10 by the reception unit 220. The configuration unit 230 also stores setting information set in advance. For example, content of the setting information is information or the like related to control of the initial access.

The control unit 240 controls the initial access as described in the example. The control unit 240 controls the operation of receiving the SS/PBCH block from the base station 10. The functional unit related to signal transmission in the control unit 240 may be included in the transmission unit 210, and the functional unit related to signal reception in the control unit 240 may be included in the reception unit 220.

(Hardware Configuration)

In the block diagrams (FIGS. 16 and 17) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmission unit or a transmitter. In any case, as described above, an implementation method is not particularly limited.

Figure 18:
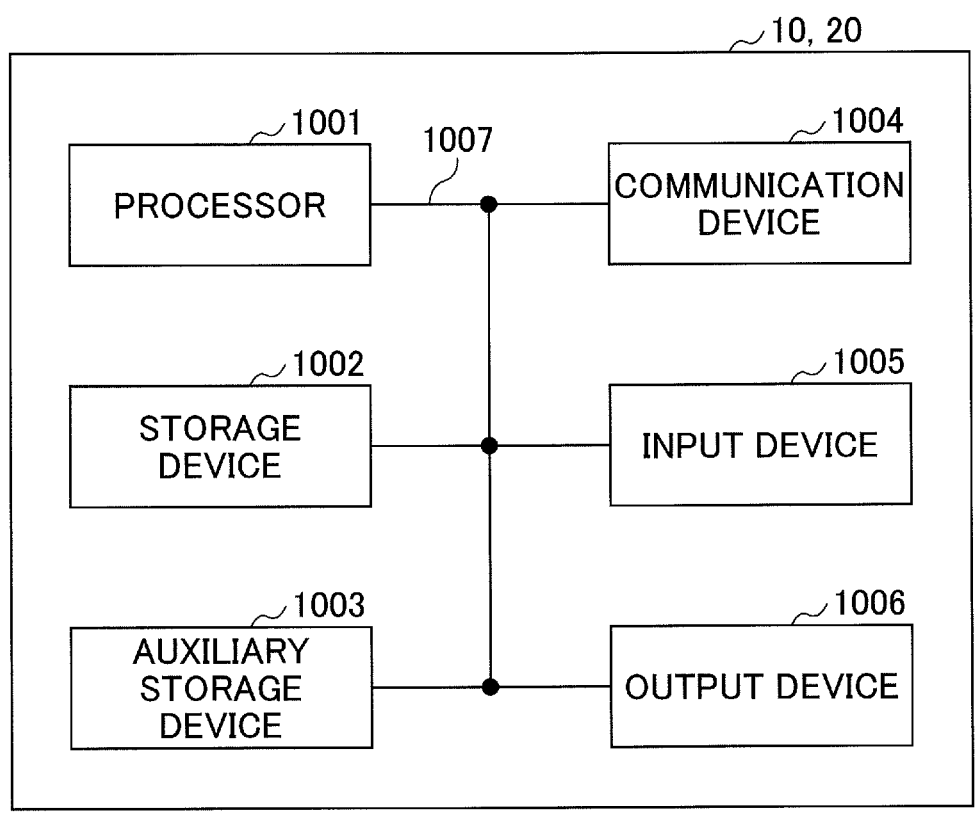
FIG. 18 is a diagram illustrating an example of a hardware configuration of the base station 10 or the terminal 20 in an embodiment of the present invention.

For example, the base station 10, the terminal 20, or the like in one embodiment of the present disclosure may function as a computer for processing the present disclosure's wireless communication method. FIG. 18 is a diagram illustrating an example of a hardware configuration of the base station 10 and the terminal 20 according to an embodiment of the present disclosure. Each of the base station 10 and the terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the terminal 20 may be configured to include one or more devices illustrated in the drawing or may be configured without including some devices.

Each function in each of the base station 10 and the terminal 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various kinds of types of processes according to them. A program causing a computer to execute at least some of the operations described in the above embodiment is used as the program. For example, the control unit 140 of the base station 10 illustrated in FIG. 16 may be implemented by a control program which is stored in the storage device 1002 and operates on the processor 1001. Further, for example, the control unit 240 of the terminal 20 illustrated in FIG. 17 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc), a smart card, a flash memory (for example, a card, a stick, or a key drive), a floppy (registered trademark) disk, a magnetic strip, and the like. The recording medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmission/reception unit, a transmission line interface, or the like may be implemented by the communication device 1004. The transmitting/reception unit may be implemented by to be physically or logically separated by a transmission unit and a reception unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station 10 and the terminal 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Conclusion of Embodiment

As described above, according to an embodiment of the present invention, a terminal including a reception unit that receives, from a base station, a first set including a plurality of resources that include at least a synchronization signal and optionally further include a broadcast channel and a second set including a plurality of resources that include at least a synchronization signal added to the first set in a frequency domain and optionally further include a broadcast channel, a control unit that assumes a Quasi co location (QCL) identical to a QCL assumed for the first set when receiving the second set, and a communication unit that executes a random access procedure with the base station based on information included in the resources is provided.

With the above configuration, the terminal 20 receives the repeatedly transmitted SS/PBCH block and improves the S/N characteristics, and thus the extended coverage can be realized. In other words, it is possible to control the coverage in the wireless communication system.

A frequency position of the second set may be changed for each period in a time domain. With this configuration, the terminal 20 receives the SS/PBCH block which is repeatedly transmitted at changed frequency positions, and thus the coverage can be extended.

The reception unit may receive, from the base station, the second set arranged at a second frequency position different from a first frequency position in which the first set is arranged. With this configuration, the terminal 20 receives the SS/PBCH block which is repeatedly transmitted at changed frequency positions in time-synchronized other carriers, and thus the coverage can be extended.

The reception unit may receive the first set and the second set in the same slot or receives the second set in a slot different from a slot for the first set. With this configuration, the terminal 20 can receive the SS/PBCH block which is repeatedly transmitted at changed frequency positions if necessary.

The reception unit may receive information indicating whether or not a plurality of resources arranged in different frequency domains are receivable together and further receive, in a case in which the plurality of resources arranged in different frequency domains are receivable together, information related to time positions or frequency positions of a plurality of the resources, information indicating a pattern related to a time arrangement of the resources, or information related to time synchronization of a carrier via which the resources are transmitted, and the control unit may perform control such that the resources are received based on the information related to the time positions or the frequency positions, the information indicating the pattern related to the time arrangement, or the information related to the time synchronization. With this configuration, the terminal 20 receives the SS/PBCH block which is repeatedly transmitted at changed frequency positions in time-synchronized other carriers, and thus the coverage can be extended.

According to an embodiment of the present invention, a communication method executed by a terminal, including a receiving process of receiving, from a base station, a first set including a plurality of resources that include at least a synchronization signal and optionally further include a broadcast channel and a second set including a plurality of resources that include at least a synchronization signal added to the first set in a frequency domain and optionally further include a broadcast channel, a control process of assuming a Quasi co location (QCL) identical to a QCL assumed for the first set when receiving the second set, and a communication process of executing a random access procedure with the base station based on information included in the resources is provided.

With the above configuration, the terminal 20 receives the repeatedly transmitted SS/PBCH block and improves the S/N characteristics, and thus the extended coverage can be realized. In other words, it is possible to control the coverage in the wireless communication system.

Supplement of Embodiment

The exemplary embodiment of the invention has been described above, but the disclosed invention is not limited to the above embodiments, and those skilled in the art would understand various kinds of modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 have been described using the functional block diagrams, but such devices may be implemented by hardware, software, or a combination thereof. Software executed by the processor included in the base station 10 according to the embodiment of the invention and software executed by the processor included in the terminal 20 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, a next generation systems extended based on these standards, or the like. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various kinds of steps using an exemplary order and is not limited to a presented specific order.

In this specification, a specific operation that is supposed to be performed by the base station 10 may be performed by an upper node in some cases. In the network including one or more network nodes including the base station 10, various kinds of operations performed for communication with the terminal 20 can be obviously performed by at least one of the base station and any network node (for example, an MME, an S-GW, or the like is considered, but it is not limited thereto) other than the base station 10 and/or the base station 10. The example in which the number of network nodes excluding the base station 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is referred to as software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the wireless technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be rearranged with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various kinds of channels (for example, a PUCCH, a PDCCH, and the like) and information elements can be identified by suitable names, various kinds of names allocated to the various kinds of channels and the information elements are not limited in any respect.

In the present disclosure, the terms "the base station (BS)", "radio base station", "base station", "fixed station", "Node B", "eNode B (eNB)", "gNodeB (gNB)", "access point", "transmission point", "reception point", "transmission/reception point", "cell", "sector", "cell group", "carrier", "component carrier", and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor the base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)", "user terminal", "user equipment (UE)", "terminal", and the like can be used interchangeably.

There are cases in which the mobile station is called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, handset, a user agent, a mobile client, a client, or some other suitable terms by those having skill in the art.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be rearranged with a user terminal. For example, each aspect/embodiment of the present disclosure may be applied to a configuration in which communication between the base station and the user terminal is rearranged with communication between a plurality of terminals 20 (for example, which may be referred to as device-to-device (D2D) or vehicle-to-everything (V2X)). In this case, the terminal 20 may have the functions of the base station 10 described above. Further, the terms "uplink" and "downlink" may be rearranged with terms (for example, "side") corresponding to inter-the terminal communication. For example, an uplink channel, a downlink channel, or the like may be read with side channels.

Similarly, the user terminal in the present disclosure may be rearranged with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be rearranged with "assuming", "expecting", "considering", or the like.

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connection" may be rearranged with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based on only" unless otherwise stated. In other words, a phrase "based on" means both "based on only" and "based on at least."

Any reference to an element using a designation such as "first", "second", or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be rearranged with "unit", "circuit", "device", or the like.

In a case in which "include", "including", and variations thereof are used in the present disclosure, these terms are intended to be comprehensive, similarly to a term "comprising." Further, the term "or" used in the present disclosure is intended not to be an exclusive disjunction.

A radio frame may include one or more frames in the time domain. In the time domain, each of one or more frames may be referred to as a sub frame. The sub frame may further include one or more slots in the time domain. The sub frame may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the subframe and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be rearranged with a TTI having a time length exceeding 1 ms, and a short TTI (for example, a reduced TTI or the like) may be rearranged with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of sub carriers included in an RB may be the same irrespective of a numerology and may be, for example, 12. The number of sub carriers included in an RB may be decided based on a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be rearranged with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a", "an", or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated", "coupled", or the like may also be interpreted similarly to "different".

Each aspect/embodiment described in this specification may be used alone, in combination, or may be switched in accordance with the execution. Further, indication of predetermined information (for example, indication of "being X") is not limited to being performed explicitly, but may be performed by implicit (for example, by giving no indication of predetermined information).

In the present disclosure, the SS/PBCH block or the SSB is an example of a resource that includes at least synchronization signal and optionally further includes a broadcast channel. The transmission unit 210 and the reception unit 220 are examples of the communication unit.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

EXPLANATIONS OF LETTERS OR NUMERALS

10 BASE STATION
110 TRANSMISSION UNIT

120 RECEPTION UNIT
130 CONFIGURATION UNIT
140 CONTROL UNIT
20 TERMINAL
210 TRANSMISSION UNIT
220 RECEPTION UNIT
230 CONFIGURATION UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal, comprising:
a reception unit that receives, from a base station,
a first set including a plurality of resources that include at least a synchronization signal and optionally further include a broadcast channel and
a second set repeatedly arranged in a frequency direction and including a plurality of resources that include at least a synchronization signal and optionally further include a broadcast channel;
a control unit that assumes a Quasi co location (QCL) identical to a QCL assumed for the first set when receiving the second set; and
a communication unit that executes a random access procedure with the base station based on information included in the plurality of resources of the first set or the plurality of resources of the second set,
wherein a frequency position of the second set is changed for each period in a time domain, and
wherein the second set comprises at least one Synchronization Signal Block (SSB).

2. The terminal according to claim 1, wherein the reception unit receives, from the base station, the second set arranged at a second frequency position different from a first frequency position in which the first set is arranged.

3. The terminal according to claim 2, wherein the reception unit receives the first set and the second set in a same slot or receives the second set in a slot different from a slot for the first set.

4. The terminal according to claim 1, wherein the reception unit receives information indicating whether or not a plurality of resources arranged in different frequency domains are receivable together, and further receives, in a case in which the plurality of resources arranged in different frequency domains are receivable together:
information related to time positions or frequency positions of a plurality of the resources;
information indicating a pattern related to a time arrangement of the resources; or
information related to time synchronization of a carrier via which the resources are transmitted, and
the control unit performs control such that the resources are received based on the information related to the time positions or the frequency positions, the information indicating the pattern related to the time arrangement, or the information related to the time synchronization.

5. A communication method executed by a terminal, the method comprising:
receiving, from a base station,
a first set including a plurality of resources that include at least a synchronization signal and optionally further include a broadcast channel and
a second set including a plurality of resources that include at least a synchronization signal repeatedly arranged in a frequency direction and optionally further include a broadcast channel;
assuming a Quasi co location (QCL) identical to a QCL assumed for the first set when receiving the second set; and
executing a random access procedure with the base station based on information included in the plurality of resources of the first set or the plurality of resources of the second set,
wherein a frequency position of the second set is changed for each period in a time domain, and
wherein the second set comprises at least one Synchronization Signal Block (SSB).

* * * * *